No. 758,058. Patented April 26, 1904.

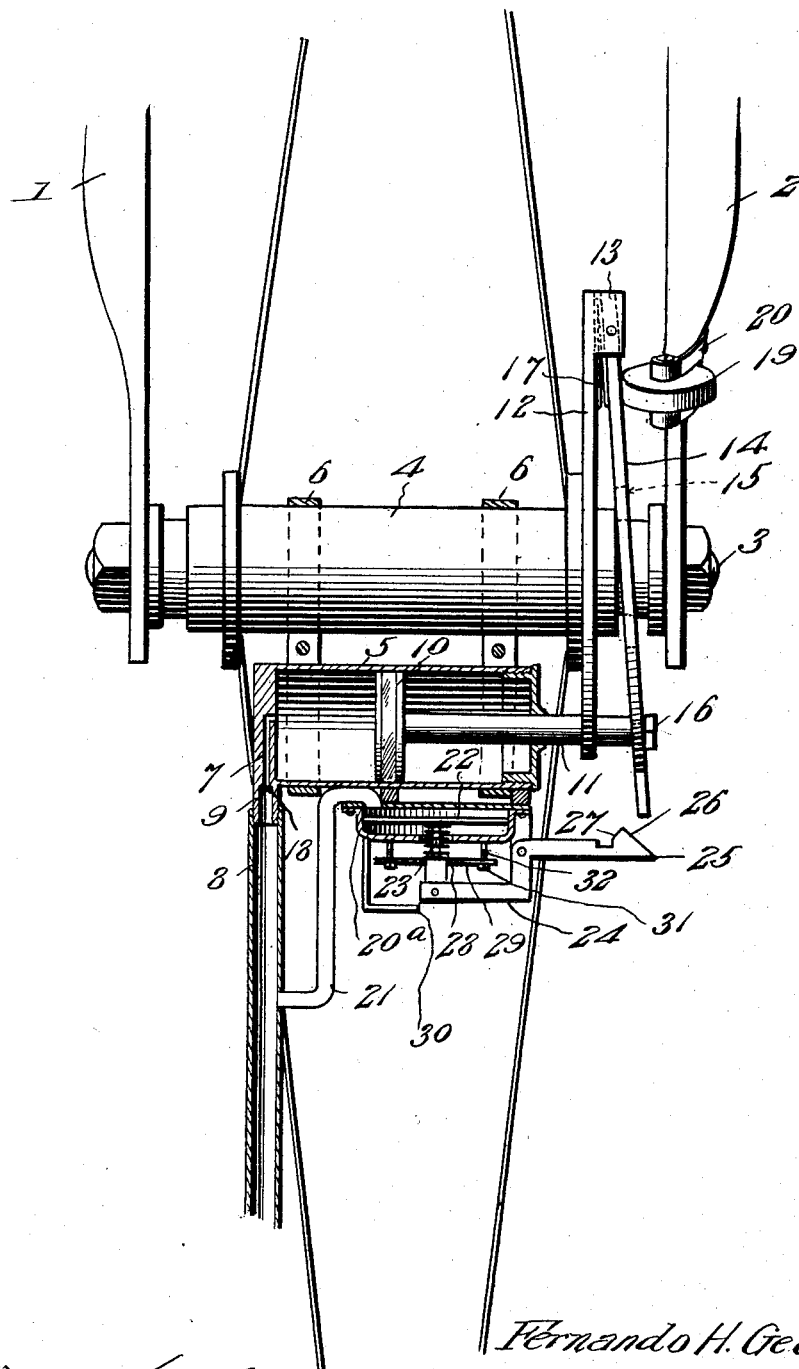

UNITED STATES PATENT OFFICE.

FERNANDO HILTON GEISLER, OF DAYTON, OHIO.

TIRE-INFLATOR.

SPECIFICATION forming part of Letters Patent No. 758,058, dated April 26, 1904.

Application filed March 18, 1903. Serial No. 148,438. (No model.)

*To all whom it may concern:*

Be it known that I, FERNANDO HILTON GEISLER, a citizen of the United States, residing at Dayton, in the county of Montgomery and State of Ohio, have invented new and useful Improvements in Tire-Inflators, of which the following is a specification.

This invention relates to tire-inflators; and the object thereof is to provide a novel arrangement of pump and coöperating mechanism for automatically inflating pneumatic tires for bicycles, automobiles, and similar vehicles.

Another object is to provide means for equalizing the pressure in the tire, so as to prevent an excessive pressure, such as would burst the tire.

With these objects in view the invention consists in arranging an inflating device to be actuated by the rotation of the wheel, one of the novel features being a pivoted spring-pressed lever carried by the hub of the wheel and connected to a reciprocating pump-piston which is actuated by the lever to introduce air into the tire through a suitable connecting means.

Another novel feature is a fluid-controlled locking-lever which is pivoted and is designed to be actuated by a diaphragm receiving a fluid impulse when a determined pressure is exerted by the pump, so that the lever for actuating the pump-piston will be held out of operative position.

Other novel features will be described in detail hereinafter, so that their constructions will become apparent by reference to the accompanying drawing, which illustrates a portion of a wheel of a bicycle to which the invention is applied, part of the mechanism being shown in section.

As the simplest form of illustrating the device I have shown it applied to the front wheel of a bicycle, of which 1 and 2 designate the front forks, in which are supported the ends of the axle 3, on which a hub 4 rotates. A pump-cylinder 5 is connected to the hub 4 by straps or other suitable fastening devices, (designated by the reference-numeral 6.) This cylinder is fastened to the hub in such a manner that it will rotate with it, and one end of the cylinder is provided with a discharge or outlet passage 7 in communication with a tube or pipe 8, connected to a nipple 9 on the cylinder and in communication with the tire of the wheel. A reciprocating piston or plunger 10 is mounted within the cylinder and is provided with the usual piston rod or stem 11, one end of which projects through the cylinder at the end opposite to the outlet-port 7. The stem or rod 11 also projects through a guide-opening 12ª in the transversely-arranged plate 12, which is fastened to the hub and provided at its end most distant from the piston-stem with parallel inturned ears or flanges 13, to which an actuating-lever 14 is pivoted. This lever 14 is in the form of a disk having a central perforation 15, through which the hub projects, and a restricted upper terminal which rests between the ears or flanges 13. The lower portion of the lever is rigidly fastened to the piston rod or stem 11 by a nut or tap 16. A spring or series of springs 17 are interposed between the supporting-plate 12 and the actuating-lever 14, so that the normal tendency of the lever is to retract or move the piston 10 away from the outlet-port 7 of the cylinder 5. By moving the piston from its retracted position toward the outlet-port or piston 7 a fluid impulse is given, which forces air through the tube 8 and into the tire. A backward pressure within the cylinder is prevented by a check-valve 18, which is mounted within the nipple 9. In order that the piston will receive the necessary impulse to move it toward the outlet-port and overcome the resistance of the spring or springs 17, I provide a disk or roller 19, which is mounted in suitable bearings 20, held by one of the forks of the frame. This roller bears against the lever at all times, and as the wheel revolves the roller 19 will bear against the outer face of the disk or lever, forcing the outer extremity toward the plate 12. This will cause the piston to be moved toward the outlet-passage 7 of the cylinder 5, so as to force the air into the tire. As soon as the wheel has reached the point in its revolution to bring the outer end of the plate of the lever beyond the roller 19 the tension of the spring 17 will be sufficient to push the free end of the lever toward one end of the hub, thereby causing the piston-head to recede from the outlet-port 7.

If the lever 14 was continuously operated, sufficient pressure would soon be provided within the tire to overcome the resistance of the material, causing the tire to burst. In order to guard against accidents of this character, a suitable safety device is provided to lock the lever 14 against actuation when a determined pressure has been provided within the tire. The safety device, which is located below the pump-cylinder, comprises a casing 20$^a$ in communication with the tube 8 by a branch pipe 21. Intermediate the ends of the casing is a transversely-arranged diaphragm 22, connected to a piston 23, which projects through one end of the casing and is pivotally secured to one end of a lever 24, fulcrumed to a suitable support carried by the cylinder 5. This lever is provided with a forwardly-projecting arm 25, the end of which is provided with a beveled head 26, upon which the end of the lever 14 can ride and be engaged by the slotted portion 27, so as to lock the lever 14 against movement. A spring 28 is coiled around the stem 23, one end of which bears against the diaphragm 22 and the other end against a plate 29, supported below the casing 20$^a$. This spring is for the purpose of returning the diaphragm to its normal position and unlocking the lever 14 when excessive pressure within the casing 20$^a$ is relieved. A spring 30 is secured to the casing 20$^a$ and normally extends partly over the inner end of lever 24. As long as there is no excessive pressure in the tire and in the diaphragm-casing the lever 14 will be free to move or vibrate with each revolution of the wheel. Thus each revolution of the wheel will cause the piston connected to the lever 14 to force air into the tire. When, however, an abnormal pressure exists, it will attempt to relieve itself by passing back from the tire through the pipe 8, and meeting resistance when it reaches the check-valve it will pass up through the pipe 21 into the casing 20$^a$. The pressure will be sufficient to overcome the strength of the springs 23 and 30, and the diaphragm will impart a slight movement to the stem connected thereto, so as to force one end of the lever away from the casing and past the spring 30, which serves to lock the lever in position. This will cause the locking end of the lever 24 to move toward the end of the lever 14, so that when the roller 19 moves the end of said lever toward a supporting-plate it will be engaged by the slotted portion 27 of the lever and be held against further movement until the excessive pressure in the tire is relieved. As soon as the pressure is reduced below the normal amount the spring 28 will restore the diaphragm to its normal position, thereby throwing the locking-lever out of engagement with the lever 14, permitting the pump to introduce the required amount of air into the tire. The tension of spring 23 may be regulated by means of nuts 31, arranged on bolts 32, extending from the casing 20$^a$.

It will be readily seen that the tire can be conveniently and expeditiously inflated by the rider as he propels the wheel, and in the event of slight punctures occurring to the tire the pump will supply enough air to compensate for the amount exhausted through the punctures. For convenience in illustration I have shown the inflating device applied to a bicycle-wheel, although it is obvious that it may be used with equal advantageous results on other types of wheels supplied with pneumatic tires. I therefore do not limit myself to the exact arrangement of parts illustrated in the accompanying drawing, but reserve the right to make such changes or alterations as fairly fall within the scope of the appended claims.

Having thus described the invention, what is claimed as new is—

1. In a pump for pneumatic tires, the combination with a wheel and a frame to which it is secured, of a pump-cylinder fixed to the wheel, a piston in the cylinder, a piston-rod extending beyond the end of the cylinder, a plate fixed to the wheel and formed with a guideway through which the piston-rod moves, a lever fulcrumed on the plate and engaging the piston-rod, a spring engaging the plate and lever to force the latter in one direction, and means on the frame engaging the lever to move the same against the force of the spring.

2. In a pump for pneumatic tires, the combination with a wheel and a frame to which it is secured, of a pump-cylinder fixed to the wheel, a piston in the cylinder, a piston-rod extending exteriorly to the cylinder, a plate fixed to the wheel and formed with a guideway through which the rod extends, a lever fulcrumed on the plate, a spring engaging the plate and lever to move the lever in one direction, operating means on the frame to move the lever against the force of the spring, a casing on the cylinder, a pipe connecting the casing to the tire, a diaphragm arranged within the casing, and a lever fulcrumed adjacent the casing and connected to the diaphragm and adapted to engage the first-named lever to hold the same out of the path of the operating means on the frame.

3. In a pump for pneumatic tires, the combination with a wheel and a frame to which it is secured, of a pump-cylinder on the wheel, a piston in the cylinder, a lever fulcrumed on the wheel and connected to the piston, a spring to move said lever in one direction, and a fixed roller on the frame to engage the lever and swing the same on its fulcrum against the force of the spring.

In testimony whereof I affix my signature in presence of two witnesses.

FERNANDO HILTON GEISLER.

Witnesses:
J. G. WILLIAMSON,
E. C. ROWLAND.